(12) United States Patent
Katagiri et al.

(10) Patent No.: US 9,343,111 B2
(45) Date of Patent: *May 17, 2016

(54) REDUCING TOTAL SEEK TIME FOR DETERMINING AN ACCESS SEQUENCE OF DATA STORED ON A TAPE MEDIUM

(71) Applicant: INTERNATIONAL BUSINESS MACHINES CORPORATION, Armonk, NY (US)

(72) Inventors: Takashi Katagiri, Yokohama (JP); Yuhko Mori, Yokohama (JP); Masakatsu Murata, Nagaizumi (JP); Hirokazu Nakayama, Fujisawa (JP); Yutaka Oishi, Kawasaki (JP)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 87 days.

This patent is subject to a terminal disclaimer.

(21) Appl. No.: 14/503,581

(22) Filed: Oct. 1, 2014

(65) Prior Publication Data

US 2015/0055442 A1 Feb. 26, 2015

Related U.S. Application Data

(63) Continuation of application No. 13/570,749, filed on Aug. 9, 2012, now Pat. No. 8,867,160.

(51) Int. Cl.
*G11B 15/18* (2006.01)
*G11B 27/10* (2006.01)
*G11B 5/55* (2006.01)
*G11B 20/10* (2006.01)

(52) U.S. Cl.
CPC ............ *G11B 27/107* (2013.01); *G11B 5/5513* (2013.01); *G11B 20/10* (2013.01); *G11B 2020/10916* (2013.01)

(58) Field of Classification Search
None
See application file for complete search history.

(56) References Cited

U.S. PATENT DOCUMENTS

| | | | |
|---|---|---|---|
| 5,845,316 A | 12/1998 | Hillyer et al. | |
| 6,763,427 B1 | 7/2004 | Doi et al. | |
| 8,526,136 B2 | 9/2013 | Katagiri et al. | |
| 8,537,490 B2 | 9/2013 | Katagiri et al. | |

(Continued)

FOREIGN PATENT DOCUMENTS

| | | |
|---|---|---|
| JP | 2011113605 A | 6/2011 |
| JP | 2012128937 A | 7/2012 |
| WO | 2010073776 A1 | 7/2010 |

*Primary Examiner* — Wayne Young
*Assistant Examiner* — Mark Fischer
(74) *Attorney, Agent, or Firm* — Griffiths & Seaton PLLC

(57) ABSTRACT

A first data group in an access sequence is selected. Those data groups located in specified regions of the tape medium are separated from other data groups located in alternative specified regions of the tape medium. The distance from the current position of the tape medium is set to be a logical distance value, determined by a calculation function, that is substituted for the physical distance value for the data groups that are located in the specified regions as compared with other data groups located in the alternative specified regions. A second data group in the access sequence is selected. The logical distance value is then determined by multiplying a coefficient based on a physical positioning of each of the data groups in the tape medium, and a percentage of those of the plurality of data groups that have already been selected as the first data group and the second data group.

21 Claims, 8 Drawing Sheets

(56) References Cited

U.S. PATENT DOCUMENTS

| | | |
|---|---|---|
| 8,654,476 B2 | 2/2014 | Katagiri et al. |
| 8,867,160 B2 | 10/2014 | Katagiri et al. |
| 2001/0034811 A1 | 10/2001 | Basham et al. |
| 2006/0149898 A1 | 7/2006 | Bello et al. |
| 2009/0248974 A1 | 10/2009 | Bello et al. |
| 2012/0054428 A1 | 3/2012 | Butt et al. |
| 2012/0154946 A1 | 6/2012 | Katagiri et al. |
| 2012/0162807 A1 | 6/2012 | Katagiri et al. |
| 2012/0250176 A1 | 10/2012 | Katagiri et al. |
| 2014/0268399 A1 | 9/2014 | Katagiri et al. |

REDUCING TOTAL SEEK TIME FOR DETERMINING AN ACCESS SEQUENCE OF DATA STORED ON A TAPE MEDIUM

BACKGROUND OF THE INVENTION

1. Field of the Invention

The present invention relates in general to computers, and more particularly to methods, computer systems, and computer program products for reducing total seek time for determining an access sequence of a plurality of data groups stored on a tape medium.

2. Description of the Related Art

As technology develops, the storage capacity of tape media (e.g., tape drive) continues to grow. Recent advances have led to some tape media having a capacity of 1.5 terabytes (TB). With this increased tape media capacity, tape media may be used in a wide range of applications, from traditional data backup and archiving to file systems.

Tape media, such as tape drives, compare favorably with hard disks in terms of capacity and transfer rate, but finding data dispersed on tape media, which may reach lengths of several hundreds of meters, often requires minutes of data seek time. Drive seek time has long been considered an important issue, and many methods for reducing seek time for various forms of data have been proposed.

In order to be viable for some modern applications, tape drives may need to be able to consecutively read multiple files or logical volumes (e.g., record groups), a process often referred to as "defrag" or "reclamation." This poses the new challenge of reducing total seek time when accessing multiple record groups in succession. One potential way of reducing total seek time, while still maintaining shortened seek times for isolated seek operations, is to modify the access sequence for the record groups. Using this method to reduce total seek time depends heavily on a variety of conditions that are unique to tape drives, including the speed and acceleration at which the tape drive moves the tape media, as well as total data band transport time, which makes access sequence modification ideal for tape drives. In order to modify the access sequence on a tape drive and minimize the amount of processing time required for modification, an algorithm with a low computational complexity is required.

SUMMARY OF THE DESCRIBED EMBODIMENTS

In one embodiment, a method is provided for reducing total seek time for determining an access sequence of a plurality of data groups stored on a tape medium. A first data group in the access sequence is selected. Those of the plurality of data groups that are located in specified regions of the tape medium are separated from those of the plurality of data groups that are located in alternative specified regions of the tape medium. The distance from the current position of the tape medium is set to be a logical distance value, determined by a calculation function that is substituted for an actual physical distance value for those of the plurality of data groups that are located in the specified regions as compared with those of the plurality of data groups that are located in the alternative specified regions. A second data group in the access sequence is selected. The logical distance value is then determined by multiplying a coefficient based on a physical positioning of each of the data groups in the tape medium, and a percentage of those of the plurality of data groups that have already been selected as the first data group and the second data group.

In another embodiment, a computer system is provided for reducing total seek time for determining an access sequence of a plurality of data groups stored on a tape medium. The computer system includes a computer-readable medium and a processor in operable communication with the computer-readable medium. The processor selects a first data group in an access sequence of a plurality of data groups stored on a tape medium based on which data group in the plurality of data groups has a beginning closest to a current position of the tape medium. Those of the plurality of data groups that are located in specified regions of the tape medium, viewed from a length direction, are separated from those of the plurality of data groups that are located in alternative specified regions of the tape medium, viewed from the length direction. The distance from the current position of the tape medium is set to be a logical distance value, determined by a calculation function that is substituted for an actual physical distance value for those of the plurality of data groups that are located in the specified regions as compared with those of the plurality of data groups that are located in the alternative specified regions. The processor selects a second data group in the access sequence based on which remaining data group in the plurality of data groups has a beginning closest to an end of the first data group in the access sequence.

In a further embodiment, a computer program product is provided for reducing total seek time for determining an access sequence of a plurality of data groups stored on a tape medium. The computer-readable storage medium has computer-readable program code portions stored thereon. The computer-readable program code portions include a first executable portion for selecting a first data group in the access sequence based on which data group in the plurality of data groups has a beginning closest to a current position of the tape medium. Those of the plurality of data groups that are located in specified regions of the tape medium, viewed from a length direction, are separated from those of the plurality of data groups that are located in alternative specified regions of the tape medium, viewed from the length direction. The distance from the current position of the tape medium is set to be a logical distance value, determined by a calculation function, that is substituted for an actual physical distance value for those of the plurality of data groups that are located in the specified regions as compared with those of the plurality of data groups that are located in the alternative specified regions. The computer-readable program code portions include second executable portion for selecting a second data group in the access sequence based on which remaining data group in the plurality of data groups has a beginning closest to an end of the first data group in the access sequence.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict embodiments of the invention and are not therefore to be considered to be limiting of its scope, the invention will be described and explained with additional specificity and detail through the use of the accompanying drawings, in which.

DETAILED DESCRIPTION OF THE DRAWINGS

Embodiments of the present invention provide methods, computer systems, and computer program products for determining the access sequence of data stored on a tape medium.

According to one aspect of the present invention, based on the fact that a file system or virtual tape server (VTS) may read multiple record groups in any given order, a new concept, the distance between record groups is defined, which may be used to modify the record group access sequence and thus reduce total seek time. When a record-group-to-record-group distance is evaluated by using a nearest neighbor selection method, a coefficient is multiplied using a calculation function, depending on the physical position of a group of records and the percentage of groups of records that have already been selected, thereby preventing the scattering of groups of records that remain without being selected and reducing total time taken for positioning. In simulation testing, this method significantly reduces total seek time at a low computational capacity, especially when large quantities of record groups were involved.

Figure 1:
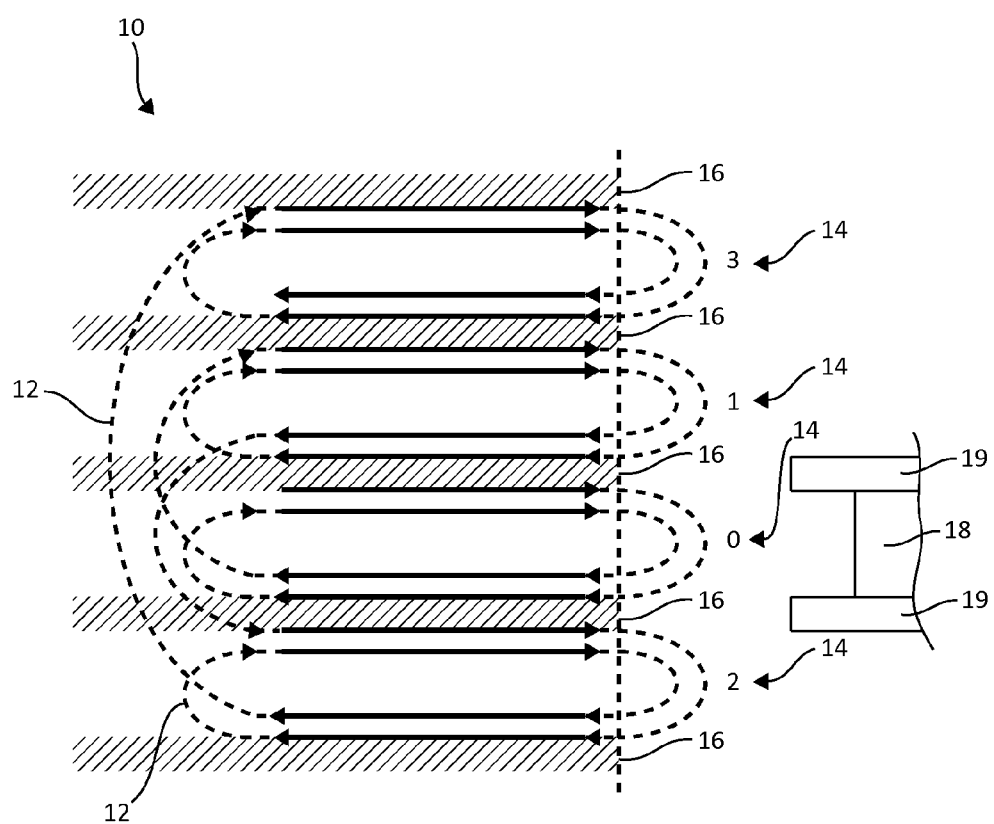
FIG. 1 is a cross-sectional view of a tape cartridge in which aspects of the present invention may be realized.

FIG. 1 illustrates a tape cartridge (or tape drive cartridge) 10 according to one embodiment of the present invention. The tape cartridge 10 includes a tape media (or tape) 12. In one embodiment, the tape media 12 has a height, or a vertical size (i.e., in the longitudinal direction) of approximately one half (½) an inch (in) and a width (i.e., in the horizontal direction)) of approximately 800 meters (m). As shown, the tape media 12 is divided into four data bands 14, which are essentially long, thin areas sandwiched between servo bands 16 (FIG. 1). The data bands 14 are numbered (0-3), indicating the order in which they are used. Although not shown, data referred to as a "servo pattern" is written into the servo bands 16 to control the locations of read/write heads 18 (along with servo band heads 19), which read and write data. A signal called a servo pattern has been written in each of the servo bands in advance. The servo patterns are used for controlling the position of a component called a head. The head (or maybe referred to as a "start" or "beginning") is used for the reading/writing of data. Time taken for the movement of the head in the vertical direction within the data band in which the head is currently located is short. In contrast, it takes approximately a few or several seconds at each time of the movement of the head from one data band to another data band that is located next to said one data band. As shown, the servo band heads 19 are positioned on the sides of the read/write heads 18. Although only one object is shown, there may be sixteen read/write heads 18. In modern tape media systems, the time required to move a head laterally in a data band is relatively short, but it may take several seconds to move the head to the adjacent data band.

To write data to tape media, an application requests the tape drive to write data in records, which may range from several bytes to several megabytes (MB) in size. This variable-length unit is called a "record". When written to the tape media 12, the records receive unique record numbers, which are used to designate the data to be read when the application attempts to access the data from the tape media. In other words, when records are written into a tape medium 12, serial numbers called as record numbers are assigned to the records, respectively. When an application reads data out of the tape medium 12, the record number is specified so as to specify the data that should be read out. The files used in file systems, and the logical volumes used in VTSs, are made up of multiple records. The tape drive repacks records received from the application into fixed-length packages/boxes (e.g., approximately 2.4 MB and may also be referred to as a "box") known as data sets (DS), which are then written to the tape media. The tape drive writes data into the tape medium while taking DS as a unit of writing. When the tape drive writes DS into the tape medium, sixteen heads write DS pieces each having a vertical size of a few or several micrometers and a horizontal size of approximately ten centimeters concurrently. When the tape drive writes data corresponding to aggregate capacity into the tape medium, reciprocation occurs on the tape medium some dozen times. Each one-way movement is called as wrap. There are twenty wraps in each of the data bands. The capacity of DS, the size of DS, the length of a tape, and the number of wraps vary from one generation to another.

In one embodiment, the tape drive system uses sixteen heads, arranged in a parallel fashion, to write the data sets to the tape media in data set fragments, which may measure several micrometers (μm) in width and approximately 10 cm in length. To write enough data to fill a tape media to capacity, the heads must complete dozens of forward and reverse passes across the tape media 12, depending on the number of wraps in the tape media. Data set capacity and size, tape length, and wrap count may vary.

The tape media 12 may contain, for example, between several million and 10 million records. As a result, it is very difficult to maintain information corresponding to the physical location of every record on the media. In order to efficiently search records written to the tape media, sets of non-volatile cartridge memory (e.g., 4 KB or 8 KB sets) on the tape cartridge are used to store a tape directory (i.e., the ranges of record numbers present on each wrap and perform seek operations).

When a file system or a VTS reads out groups of records, the sequential order of reading them may be arbitrarily set. With a focus on such an arbitrary nature of the order of reading, as will be described below, the total seek time may be shortened by introducing the concept of "distance between one group of records and another group of records" and adjusting the sequential order of accesses to the groups of records by using this concept. The results of a simulation show that this method can significantly reduce total seek time with short/small computation time/amount especially when the number of groups of records accessed is large.

One way to reduce total seek time when consecutively accessing multiple record groups is to modify the record group access sequence. Essentially, this is an non-deterministic polynomial-time (NP-hard) problem, as is commonly understood, in combinatorial optimization, similar in many ways to the "traveling salesman problem." However, in the traveling salesman problem, the traveling cost from point A to point B is the same as the traveling cost from point B to point A. In the multiple record group access sequence problem, record groups are long, meaning that the traveling cost from the end of record group A to the beginning of record group B is different than the traveling cost from the end of record group B to the beginning of record group A.

In accordance with one aspect of the present invention, the traveling cost is conceived as the distance between record groups. By using this concept and combining newly developed nearest neighbor and pairwise exchange algorithms (described below) to establish the record group access sequence total seek time may be reduced.

The distance between record groups (hereinafter may be referred to as "record-group-to-record-group distance") is defined as a representation of record group traveling cost. This distance does not refer to the physical distance between record groups stored on tape media, but rather to the time required to move between record groups. The distance between record group A and record group B (t(A,B)) is primarily affected by the following two factors: tL(A,B), time required for movement along the horizontal direction of the tape media (e.g., the width direction) and tD(A,B), the time required for movement on the data band.

Thus, the distance between record groups A and B t(A,B) may be defined as $$t(A,B)=tL(A,B)+tD(A,B) \quad (1)$$

Variables for determining tL(A,B) include: IE(A), the distance between the beginning of the tape media and the end of record group A; IS(B), the distance between the beginning of the tape media and the beginning of record group B; s(A), the tape media transport speed when reading record group A; s(B), the tape media transport speed when reading record group B; sR, the tape media transport speed when positioning operations are performed; a, tape media acceleration; IR(A), the distance moved during a change in speed from s(A) to sR; and IR(B), the distance moved during a change in speed from sR to s(B).

Using the above variables, the time required for movement along the horizontal direction of the tape media, tL(A,B) may be expressed in the following formula. However, it is assumed that the distance between IE(A) and IS(B) is long enough so that they may not be reached during acceleration and deceleration. When the distances are too short, the variables are considered self-evident and may be eliminated.

$$tL(A,B)=|sR-s(A)|/a+(|IE(A)-IS(B)|-IR(A)-IR(B))/sR+|sR-s(B)|/a. \quad (2)$$

Variables for determining tD(A,B) include: tD, the time required to move to the adjacent data band and d(A,B), the function that returns the number of data bands passed when seeking from the end of record group A to the beginning of record group B (e.g., a function that returns the number of data bands in movement at the time of positioning from the end of the group of records A to the beginning of the group of records B.)

Using the above variables, the time required for movement on the data band tD(A,B) may be expressed as the product of tD and d(A,B) as $$tD(A,B)=tDd(A,B). \quad (3)$$

If the number of record groups to be accessed is relatively small (e.g., ten), around robin method may be applied to analyze every access sequence combination and calculate the total seek time (i.e., the total distance between record groups in each access sequence). In other words, the round robin method may be used to calculate the sum of the record-group-to-record-group distance of each order of access for all access-order combinations, thereby calculating a total seek time, and adopt the order of access that minimizes the value. However, if the number of groups of records that should be accessed is greater than the sum of the record-group-to-record-group distance, the amount of calculation that is necessary for finding total seek time for all combinations increases sharply. Therefore, it is impossible to determine the sequential order of accesses within a practical length of time.

The access sequence that produces the shortest total seek time would thus be the most effective choice. However, when more record groups are involved, calculating the total seek time for every possible combination requires a much higher level of computational effort that makes it very difficult to establish an access sequence within a realistic amount of time.

By developing, combining, and applying the concept of "record-group-to-record-group distance" as used in combination with the nearest neighbor and pairwise exchange algorithms (or methods), the amount of time required to establish an access sequence for large quantities of record groups may be limited. Total seek time may also be reduced more effectively than approaches that access the groups randomly or in order of record number.

Figure 2A:
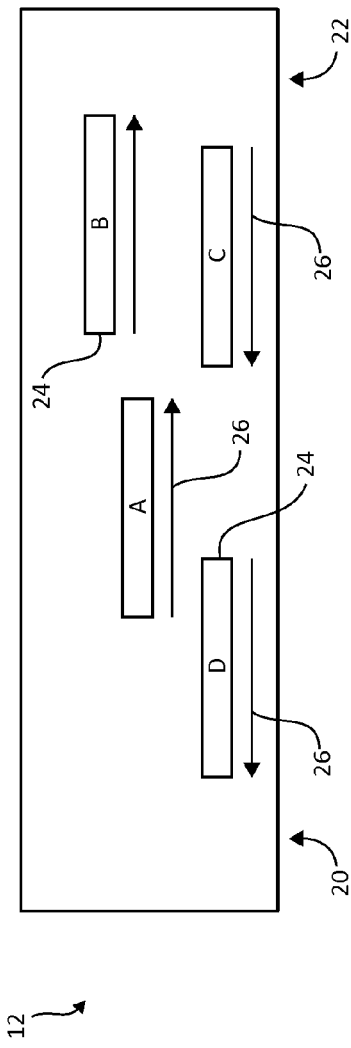
FIG. 2A is a schematic plan view of a tape medium within the tape cartridge of FIG. 1 in which aspects of the present invention may be realized.

FIG. 2A illustrates the tape medium 12 of FIG. 1 and may be used to illustrate the nearest neighbor method and the pairwise exchange method, which are described below. The tape medium 12 includes a beginning (i.e., beginning of tape) section 20 and end (i.e., end of tape) section 22 and has four record groups 24 (i.e., record group A, record group B, record group C, and record group D) written thereon. Arrows 26 indicate the direction in which each of the record groups 24 are written and/or read.

Figure 2B:
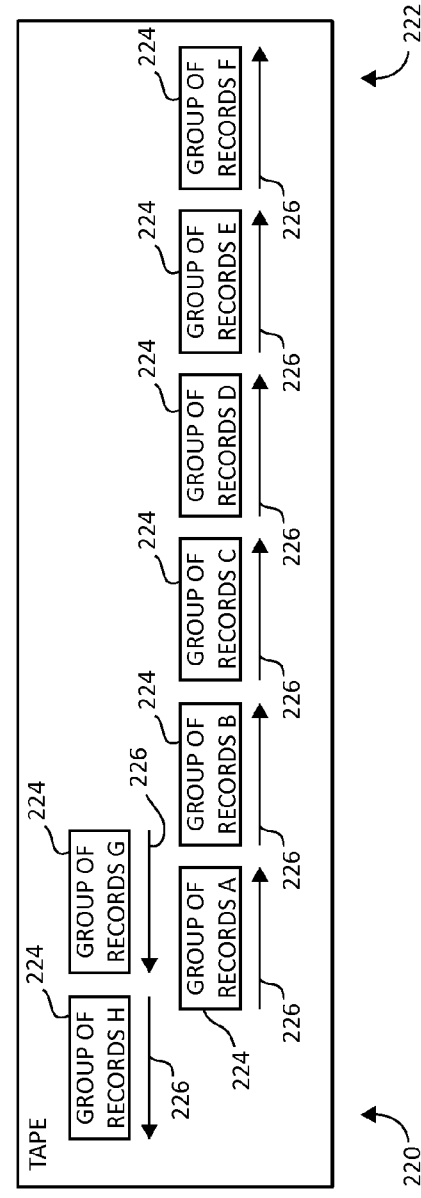
FIG. 2B is a schematic plan view of a tape medium within the tape cartridge of FIG. 1 for reducing total seek time for determining an access sequence of a plurality of data groups stored on a tape medium in which aspects of the present invention may be realized

FIG. 2B is a schematic plan view of a tape medium 212 within the tape cartridge of FIG. 1 for reducing total seek time for determining an access sequence of a plurality of data groups stored on a tape medium in which aspects of the present invention may be realized. The tape medium 212 includes a beginning (i.e., beginning of tape) section 220 and end (i.e., end of tape) section 222 and has eight record groups 224 (i.e., record group A, record group B, record group C, record group D, record group E, record group F, record group G, and record group H) written thereon.

As described in FIG. 2B, and as also used throughout the description, a "logical" record-group-to-record-group distance is a new derivative from the record-group-to-record-group distance described above. The record-group-to-record-group distance in the is hereinafter referred to as "physical" record-group-to-record-group distance. Arrows 26 indicate the direction in which each of the record groups 24 are written and/or read. With the algorithms/calculation functions of the present invention, it is possible to reduce total time taken for positioning (e.g., reducing the total seek time) by adopting the logical record-group-to-record-group distance in place of the physical record-group-to-record-group distance. In one embodiment, the logical distance for the record-group-to-record group is set to be a value that is smaller than the actual physical distance value by conversion with relative smallness for the data groups/records that are located in the one specified region (e.g., the end regions of a tape drive) as compared with the data groups/records that are located within an alternative, specified region (e.g., the middle region of a tape drive). The results of a simulation show that the invention produces a certain level of effects even in a case where the positions of groups of records are set randomly.

Figure 4:
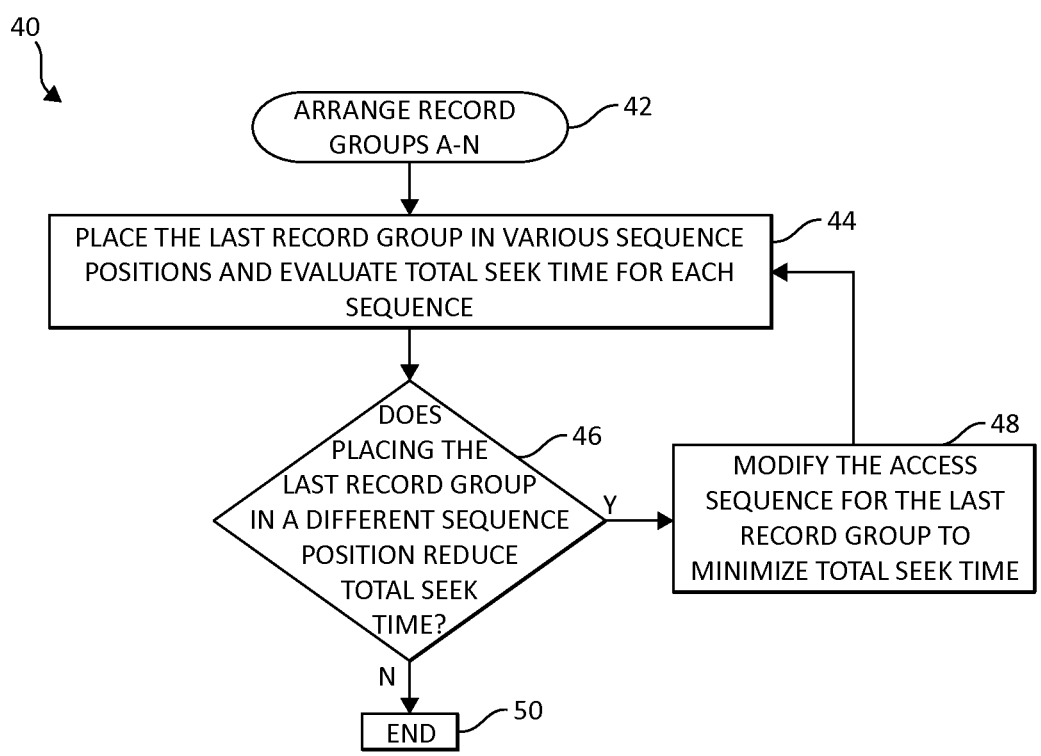

However, the arrangement of groups of records experience less efficient processing if the nearest neighbor selection method is used without the use of the algorithms/calculation functions of the present invention, as illustrated below. In FIG. 2B, arrows 26, shown under each of the groups of records, indicates that the group of record should be read in the direction shown by the arrow. In other words, the beginning of each group of records under which a right-pointing arrow is shown is located at the left end thereof. The beginning of each group of records under which a left-pointing arrow is shown is located at the right end thereof. It is assumed in FIG. 2B, for illustration purposes only, that the initial position is set at the left end of the tape 212. If the nearest neighbor selection method is used without the algorithms/calculation functions of the present invention, group of records A, which has a beginning position that is the closest to the initial position is selected first. Next, the group of records B has a beginning position that is the closest to the end/tail of the group of records A; this group of records is selected. In the same manner as above, it is recommended that the illustrated groups of records should be read in the sequential order of ABCDEFGH (this process is similar to the process illustrated in FIG. 2A using the nearest neighbor method without the algorithms/calculation functions of the present invention. Even if the tail end permutation method (e.g., pairwise exchange method), as described below in FIG. 4, is applied to the result of the nearest neighbor selection described above, in a case where the groups of records are in the illustrated arrangement, it will produce the opposite adverse effects if the calculation functions and the logical distance value, as described below, are not used. In other words, even if the group of records H is inserted into any place other than the last place, total time taken for positioning will increase.

More specifically, when reading logical volumes during reclamation, seek operations to logical volumes scattered on the tape media form a bottleneck because a significant length of time is required for positioning to the beginning of the group of records G after the completion of the reading of the group of records F. For example, assuming that the length of the tape is 800 meters (m), and the running speed of the tape is 10 m/seconds (sec), it will take approximately one minute for the FG positioning (e.g., total seek time from F to G). However, using the nearest neighbor method with the calculation functions and the logical distance value of the present invention, the algorithm of the nearest neighbor selection method judges that the logical record-group-to-record-group distance from the initial position to the group of records H is shorter than the logical record-group-to-record-group distance from the initial position to the group of records A because the tail of the group of records H is the closest to the left end of the tape. Thus, the algorithm of the nearest neighbor selection method, using the calculation functions and the logical distance value, recommends that the illustrated groups of records should be read in the sequential order of HABCDEFG. (Depending on the arrangement of the groups of records and the settings of parameters, there is a possibility that it might further recommend that the group of records G should also be read at an earlier point in time.) With the application of the tail end selection method (e.g., the pairwise exchange method) using the calculation functions and the logical distance value, the methods determine that the group of records G should preferably be read between the reading of the group of records A and the reading of the group of records B, instead of reading the group of records G as the last one. It is possible to make total time taken for positioning shorter by reading the group of records G there between. Thus, it is possible to request the host to read the illustrated groups of records in the sequential order of HAGBCDEF. The reading of the illustrated groups of records in this sequential order eliminates the need for positioning to the head of the group of records G after the completion of the reading of the group of records F. For this reason, it is possible to reduce total time taken for positioning by half. Thus, the illustrated embodiment described herein, further reduces the total time taken for positioning by adopting the logical record-group-to-record-group distance in place of the physical record-group-to-record-group distance. The results of a simulation show that the invention produces a certain level of effects even in a case where the positions of groups of records are set randomly.

Figure 3:
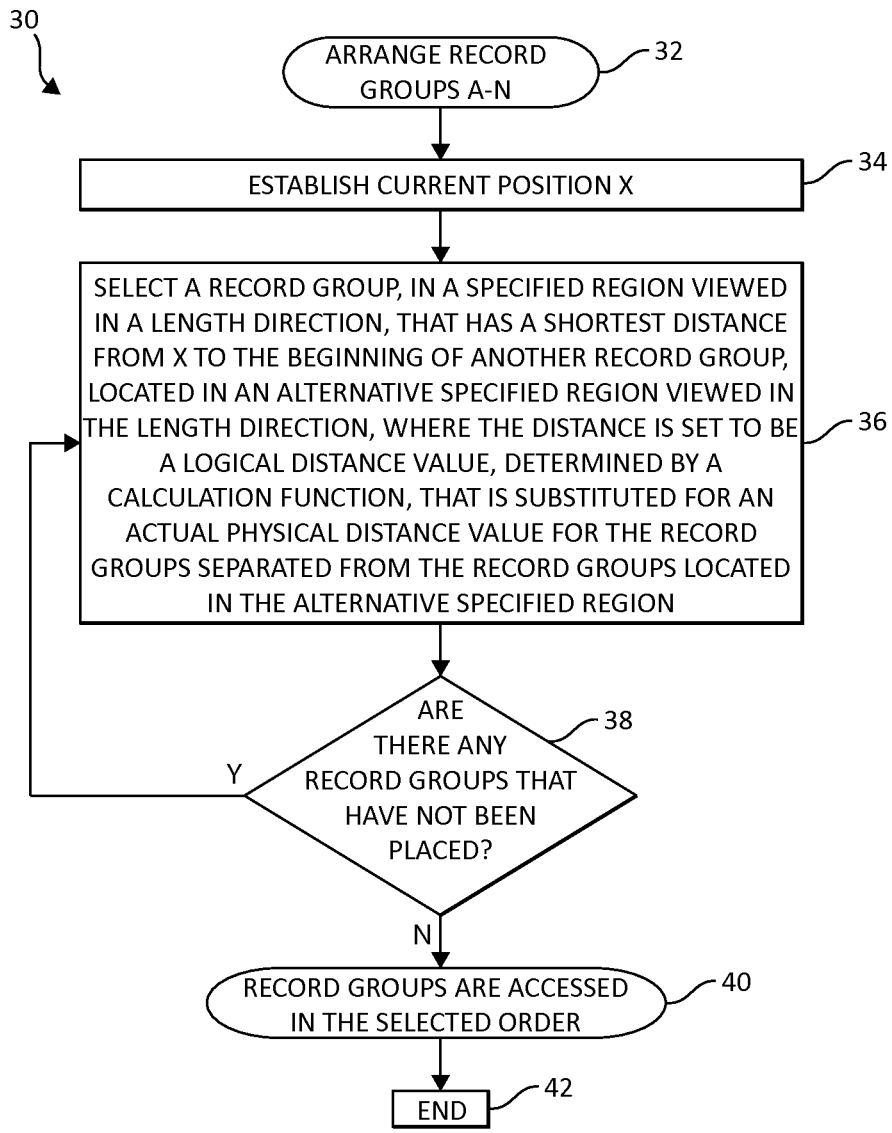
FIGS. 3 and 4 are flow charts illustrating methods according to various aspects of the present invention for reducing total seek time for determining an access sequence of a plurality of data groups stored on a tape medium.

FIG. 3 illustrates the nearest neighbor method 30, according to one embodiment of the present invention. At step 32, the method 30 begins with the record groups 24 (i.e., record groups A-n) arranged as shown in FIG. 2. At step 34, the tape medium 12 (FIG. 2) position is established. In one embodiment, the tape medium is positioned at the beginning 20 (i.e., a head of the tape medium system is positioned at the beginning 20).

At step 36, the record group 24 which starts (i.e., depending on the read/write direction 26) that offers the shortest record-group-to-record-group distance from the current location, that is, the nearest group of records therefrom, is selected as the first record group 24 to be read. In other words, at step 36 a record group in a specified region, viewed in a length direction, having a shortest distance from X to the beginning of another record group, and located in an alternative specified region viewed in the length direction is selected, where the distance is set to be a logical distance value, determined by a calculation function, that is substituted for an actual physical distance value for the record groups separated from the record groups located in the alternative specified region In the example shown in FIG. 2A, record group A is selected at it starts closest to the beginning section 20 of the tape medium 12. Also at step 36, the tape position is reset to the end of the selected record group 24.

At step 38, if there are remaining record groups 24 that have not been placed in the record sequence, the method 30 returns to step 36. In the example shown in FIG. 2, the record group whose beginning is closest to the end of record group A is record group B. Thus, in this example, record group B is chosen as the second group in the access sequence, and the tape position is reset to the end of record group B.

At step 38, the method 30 again returns to step 36, as there are remaining record groups 24 that have not been placed in the record sequence. At step 36, record group C is selected next as it starts closest to the end of record group B. The method continues as such until all of the record groups 24 are placed in the access sequence. In this example, the last record group 24 in the sequence is record group D.

At step 38, if all of the record groups 24 have been placed in the access sequence, the method 30 continues to step 40 where the record groups 24 are accessed in the selected order of the access sequence, after which the method 30 ends at step 42.

Thus, with the nearest neighbor algorithm using the calculation functions and the logical distance value, the record group 24 that offers the shortest record-group-to-record-group distance from the current location, that is, the nearest group of records therefrom, is selected out of a multiplicity of access-target groups of records. The selected group of records is set as the first one in the sequential accesses. Next, a group of records that offers the shortest record-group-to-record-group distance from the end of the first one in the sequential accesses is selected out of the remaining access-target groups of records. The selected group of records is set as the second one in the sequential accesses. The sequential order of accesses is determined by repeating the same process as above until no group of records remains. The nearest neighbor method provides much shorter record group seek time in the first half of the sequence, but may not significantly reduce seek time in the second half.

FIG. 4 illustrates the pairwise exchange method 40 which may be used to modify the access sequence generated by the nearest neighbor method 30, according to one embodiment of the present invention. By the pairwise exchange method, the sequential order of accesses to the groups of records is adjusted. The pairwise exchange method helps to overcome weakness of the nearest neighbor selection method, that is, a phenomenon that seeks time for the latter half of the groups of records in the sequential order of accesses is relatively long. In the pairwise exchange method, for the group of records that is the last one in the sequential accesses, the order of access to the last record is tentatively set at an arbitrary position. Under this tentative setting, the work of adopting the order of access that minimizes total seek time is repeated until there is no change in the group of records that is the last one in the sequential accesses.

The method 40 begins at step 42 with the record groups 24 being arranged in the order of the access sequence as determined by the nearest neighbor method 30 of FIG. 3. For this example, the access sequence determined by the nearest neighbor method 30 may be assumed to be ABCD (i.e., A is accessed first, B is accessed second, C is accessed third, and D is accessed last). At step 44, the last record group in the access sequence (e.g., record group D) is placed in all possible sequence positions and the total seek time for each of the possible sequences is calculated. Thus, the total seek time is calculated for each of the access sequences DABC, ADBC, ABDC, and ABCD.

At step 46, if placing the last record group in a position different than that determined by the nearest neighbor method 30 reduces total seek time, the method 40 continues to step 48. At step 48 the access sequence with the shortest seek time is used to modify the access sequence that is to be used as the method returns to step 44. As an example, it may be assumed that access sequence DABC provided the shortest seek time. Thus, when returning to step 44, DABC is used.

Thus, at step 44, record group C, which now occupies the last spot in the sequence, is placed in all possible sequence positions to evaluate total seek time. The different sequences then become CDAB, DCAB, DACB, and DABC.

At step 46, if the sequence with the shortest total seek time is DABC, the method 40 proceeds to step 50. This is the case because this result matches the most recent result (from Step 2). Thus, DABC is chosen as the optimal read sequence (in addition to the last element of the sequence, the last n elements of the sequence may be rearranged, as well. The nearest neighbor exchange method may also be applied where the distance between record groups is the longest. At step 50, the method 40 ends with, for example, the record groups 24 being accessed in the order of the latest modified access sequence.

Thus, in the pairwise exchange method, the record group in the access sequence's final position (or last several positions) is placed in different access sequence positions, and the access sequence that produces the shortest total seek time is chosen. This process is repeated until the record group in the sequence's final position no longer changes. The pairwise exchange method may improve group seek time in the second half of the access sequence by using the calculation functions and the logical distance value for determining the shortest distance.

In order to assess the effectiveness of the above methods for reducing total seek time, a simulation environment was created. The difference between the length of total seek time obtained when the round robin method is used and the length of total seek time obtained when the groups of records are accessed in the order of ordinal record numbers are shown in Table 1.

The difference between the length of total seek time obtained when this method, that is, the nearest neighbor selection and the tail end permutation, is used and the length of total seek time obtained when the groups of records are accessed in the order of ordinal record numbers is shown in Table 2. To obtain numerical data shown in these tables by running a simulation, 1,000 samples generated by using a random generation method were prepared for each number Z ("group set") shown at the leftmost column therein as "the number of groups of records". For each group set, the average of the results for these samples is shown therein. The term "reduction percentage" means the percentage of a reduction in seek time obtained with the use of the round robin method (Table 1) or the method described herein using the calculation functions and the logical distance value (Table 2).

TABLE 1

| Time-shortening effects produced by the round robin method | | | | | |
|---|---|---|---|---|---|
| NG | RN | RR | TR | per | TR % |
| 8 | 112 | 68 | 44 | 5.5 | 39 |

As illustrated in Table 1, the time-shortening effects produced by the round robin method are displace where NG is the number of groups of records that were accessed consecutively, RN is the average of total seek time [sec.] of 1,000 samples that was obtained when the groups of records were accessed in the order of ordinal record numbers as in a conventional scheme, RR is the average of total seek time [sec.] of 1,000 samples that was obtained when the sequential order of accesses was adjusted by using the round robin method, TR is the difference between the average of total seek time [sec.] obtained by using the round robin method (RR) and the average of total seek time obtained by using the conventional record-number method (RN), per is the seek-time difference per group of records [sec.], and TR % is the percentage of a reduction in seek time obtained with the use of the round robin method (RR) as compared with the conventional record-number method (RN). Turning now to table 2, the time-shortening effects produced by present invention using the calculation functions and the logical distance value, as described herein, are illustrated.

TABLE 2

| Time-shortening effects produced by using the calculation functions and the logical distance value | | | | | |
|---|---|---|---|---|---|
| NG | RN | N + T | TR | per | TR % |
| 8 | 112 | 74 | 38 | 4.8 | 34 |
| 16 | 191 | 113 | 78 | 4.9 | 41 |
| 32 | 327 | 172 | 155 | 4.8 | 47 |
| 64 | 614 | 256 | 358 | 5.6 | 58 |
| 128 | 1193 | 398 | 795 | 6.2 | 67 |
| 512 | 4592 | 1011 | 3581 | 7.0 | 78 |
| 1024 | 9114 | 1716 | 7398 | 7.2 | 81 |

As illustrated in table 2, N+T is the average of total seek time [sec.] of 1,000 samples obtained when the sequential order of accesses was adjusted by using the calculation functions and the logical distance value of the present invention, TR is the difference between the average of total seek time [sec.] obtained by using the calculation functions and the logical distance value of the present invention (N+T) and the average of total seek time obtained by using the conventional record-number method (RN), NG is the number of groups of records that were accessed consecutively, RN is the average of total seek time [sec.] of 1,000 samples that was obtained when the groups of records were accessed in the order of ordinal record numbers as in a conventional scheme, per the seek-time difference per group of records [sec.], and TR % is the percentage of a reduction in seek time obtained with the use of the round robin method (RR) as compared with the conventional record-number method (RN).

As described in FIGS. 3-4, the method for shortening total time taken for positioning by using a combination of the nearest neighbor selection method and the tail end permutation method is effective to reduce the total seek time, but has a disadvantage in that the record-group-to-record-group distance in the latter half in the nearest neighbor selection method is long. Even when the tail end permutation method is applied, time taken for positioning for the latter half of the groups of records is relatively long. Thus the embodiments of the present provide further ability to reduce total seek time, one of the prominent performance disadvantages of tape drives, to both the nearest neighboring selection and the tail end permutation method by using the calculation functions and the logical distance value. In one embodiment, when the record-group-to-record-group distance is evaluated by using the nearest neighbor selection method, a coefficient is multiplied, using a calculation function, depending on the physical position of a group of records and the percentage of groups of records that have already been selected, thereby preventing the scattering of groups of records that remain without being selected and reducing total time taken for positioning.

As described herein, a "logical" record-group-to-record-group distance is a new derivative from the actual physical record-group-to-record-group distance. The record-group-to-record-group distance is hereinafter referred to as "physical" record-group-to-record-group distance. A logical record-group-to-record-group distance l(A, B) from a group of records A, which is the source (departure) of movement, to a group of records B, which is a candidate of the destination of movement, is as follows:

$$l(A,B)=t(A,B)*f(B) \quad (4)$$

Thus, the calculation function "f( )" for returning the coefficient" means that "f( )" is the function to calculate the coefficient". For example, the function returns the value X, meaning that the result of the calculation of the function is the value X. Thus, coefficient f(B) multiplied by t(A, B) is l(A, B) or in other words l(A, B)=t(A, B)*f(B).

When the record-group-to-record-group distance is evaluated by using the nearest neighbor selection method, the logical record-group-to-record-group distance is used as a substitute for the physical record-group-to-record-group distance. Thus, rather than measuring the actual distance from one record group to another record group, a logical distance value is calculated and returned for selecting a first data group (e.g., a record group) in the access sequence based on which data group in the data groups that has a beginning closest in distance to a current position of the tape medium. The distance from the current position of the tape medium is set to be a logical distance value, determined by the calculation function. In the applied calculation function "f( )" denotes a function that returns a coefficient depending on the position of the group of records at the destination, that is, the group of records B and the percentage of groups of records that remain without being selected. In one embodiment of the present invention, consider that modifications are made in such a way as to concentrate the groups of records that remain without being selected at the center region of a tape medium (not at the left-end/right-end region but at the center in FIG. 1). Needless to say, the place where the group of records should remain in a concentrated manner is not limited to the center of a tape medium. The place may be "BOT" (Beginning of Tape—the left end in FIG. 1), "EOT" (End of Tape—the right end in FIG. 1), the center of gravity of a specific data band or a specific group of records, or a location found by averaging some of these locations with the use of a weighted average method. The function f( ) for returning the coefficient is defined as follows. As will be used and illustrated below, the variables of the calculation function are as follows: L is the entire length of a tape, S is the position of the beginning (head/start) of the movement-destination record (e.g., record B) in the length direction of the tape medium, E is the position of the tail (end) of the movement-destination record (e.g., record B) in the length direction of the tape medium, K is a constant that is used for determining resolution in the length direction of the tape medium when finding the coefficient, wherein the constant is not less than two, and a( ) is a function for determining an auxiliary coefficient for determining the value that is to be returned, for example, a function that returns 0.05*(1−X), wherein X denotes the ratio of the number of groups of records that are not selected to the number of all groups of records selected.

As mentioned above, the present invention seeks to reduce the total seek time for determining an access sequence of a plurality of data groups stored on a tape medium. A first data group is selected in the access sequence based on which data group in the data groups has a beginning closest in distance to a current position of the tape medium. In selecting the first data group, those data groups that are located in specified regions (e.g., in two end regions) of the tape medium that are viewed from a length direction, are separated from other data groups that are located in alternative specified regions (e.g., in the middle region) of the tape medium that are viewed from the length direction. The distance from the current position of the tape medium is set to be the logical distance value (which is a new derivative calculated from the actual physical record-group-to-record-group distance), determined by the calculation function, that is substituted for an actual physical distance value for those of the plurality of data groups that are located in the specified regions as compared with those of the plurality of data groups that are located in the alternative specified regions.

The logical distance value for selecting the first data group based on the data group in the data groups having a beginning closest in distance, according to the logical distance value, to a current position, prevents a scattering of the data groups that have not yet been selected, and reduces a total time taken for positioning. For determining the logical distance value, the calculation function multiplies a coefficient based on a physical positioning of each of the plurality of data groups in the tape medium and a percentage of those of the plurality of data groups that have already been selected as the first data group and the second data group. The logical distance value may change either in a linear, stepwise, and curved pattern according to the calculation function. The tape drive may be separated and divided into specified regions. One specified region may be divided at two respective ends, and then separated from an alternative specified region of the tape medium by dividing an entire region into three regions in the length direction of the tape medium. For example, the entire region may be divided into three regions; two end regions and one middle region. The middle region and the two end regions (which are separated from each other by the middle region) are divided up in the length direction of the tape medium.

For determining the logical distance value, consider the following seven (7) cases for selecting a data group that has a beginning (e.g., start or head) that is closest to a current position (e.g., position "X") in a tape medium. In each of the 7 cases, as mentioned above, the variables used are as follows: L is an entire length of the tape media, S is a position of the beginning of the movement-destination one of the plurality of data groups in the length direction of the tape medium, E is a position of the end of the movement-destination one of the plurality of data groups in the length direction of the tape medium, K is a constant not less than two, that is used for determining a resolution in the length direction of the tape medium when finding the coefficient, and a( ) is a function for determining an auxiliary coefficient for determining the logical distance value that is to be determined.

For case 1, the value of "1" is returned and used if both the beginning of the movement-destination record B and the end of the movement-destination one of the data groups are not less than L/K and not greater than $L*(K-1)/K$. (That is, the coefficient of "1" is returned in a case where (L/K) less than or equal to ((e.g., "<="), $S<=L*(K-1)/K$, and, in addition, $(L/K)<=E<=L*(K-1)/K$.) For case 2, the logical distance value is determined to be the value resulting from the equation of $[1-(L/K-E)/(L/K)*a( )]$ if the beginning of the movement-destination one of the data groups is not less than (L/K) and not greater than $(L*(K-1)/K)$ and the end of the movement-destination one of the plurality of data groups is less than (L/K), (That is, in a case where $(L/K)<=S<=L*(K-1)/K)$ and (E: (L/K)>E, or $E>L*(K-1)/K)$. For case 3, the value pursuant to Case 2 is returned wherein the value of E is assumed to be L−E if the end of the movement-destination record B is greater than $L*(K-1)/K$. In other words, the logical distance value is determined to be the value resulting from the equation of $[1-(L/K-E)/(L/K)*a( )]$ where a value of E is assumed to be a value of (L−E) if the end of the movement-destination one of the plurality of data groups is greater than $[L*(K-1)/K]$. In case 4, the logical distance value is determined to be the value resulting from the equation of $[1-(L/K-S)/(L/K)*a( )]$ if the end of the movement-destination one of the plurality of data groups is not less than (L/K) and not greater than $(L*(K-1)/K)$ and the beginning the movement-destination one of the plurality of data groups is less than (L/K), (That is, in a case where $(L/K)<=E<=L*(K-1)/K)$, (S: (L/K)>S, or $S>L*(K-1)/K)$. In case 5, the value pursuant to Case 4 is returned wherein the value of S is assumed to be L−S if the beginning of the movement-destination record B is greater than $L*(K-1)/K$. In other words, in case 5, the logical distance value is determined to be the value resulting from the equation of $[1-(L/K-S)/(L/K)*a( )]$ where a value of S is assumed to be the value of (L−S) if the beginning of the movement-destination one of the plurality of data groups is greater than $[L*(K-1)/K]$. For case 6,—In the other cases, the logical distance value is determined to be the value resulting from the equation of $1-(L/K-S)/(L/K)*a( )-(L/K-E)/(L/K)*a( )]$ if both the beginning and the end of the movement-destination one of the plurality of data groups is less than (L/K). In case 6, the value pursuant to case 6 is returned if the beginning of the movement-destination record B and/or the end thereof is/are greater than $L*(K-1)/K$, wherein it is assumed to be L−[SE]. In other words, the logical distance value is determined to be the value resulting from the equation of $1-(L/K-S)/(L/K)*a( )-(L/K-E)/(L/K)*a( )]$ if both the beginning and the end of the movement-destination one of the plurality of data groups is less than (L/K). In case 7, the logical distance value is determined to be the value resulting from the equation of $1-(L/K-S)/(L/K)*a( )-(L/K-E)/(L/K)*a( )]$ if either one of or both the beginning and the tail of the movement-destination one of the plurality of data groups is greater than $[L*(K-1)/K]$, where a value of S is assumed to be the value of (L−S).

Having selected the first data group, the present invention may next select a second data group in the access sequence based on which remaining data group in the data groups has a beginning closest to an end of the first data group in the access sequence. The beginning is also calculated using the logical distance value determined by the calculation function.

Figure 5:
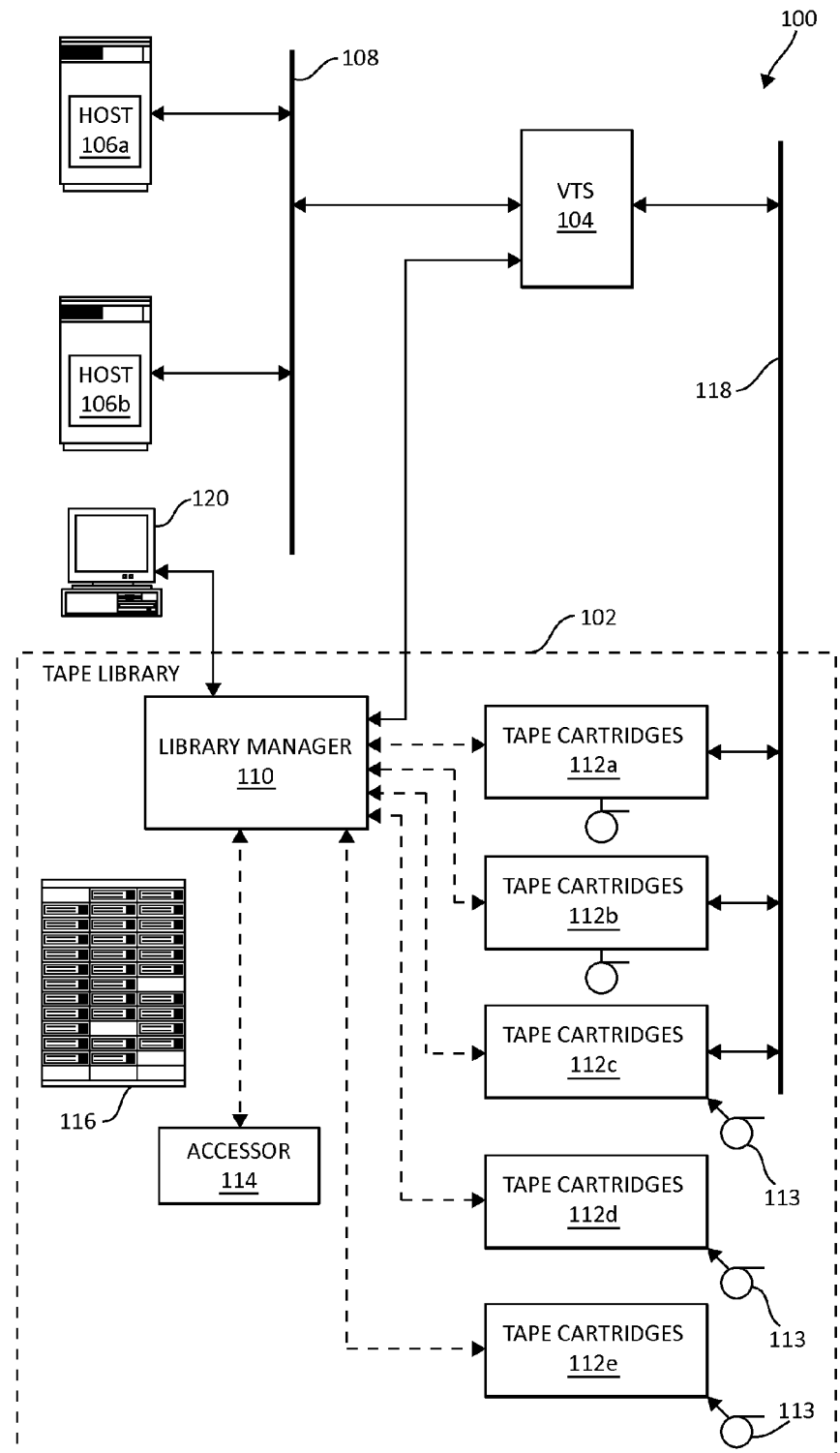
FIG. 5 is a schematic block diagram of an exemplary embodiment of a representative virtual tape system.

FIG. 5 illustrates an exemplary embodiment of a representative VTS system 100, which may be used in accordance with the present invention. The system 100 includes a tape library 102, at least one VTS 104 (primary cache), and at least one host 106 (shown as 106a and 106b). Each host 106 may be a mainframe computer. Alternatively, the host (users) 106 may be servers or personal computers using a variety of operating systems. The host 106 and the VTS 104 are connected via a storage area network (SAN) 108 or another suitable communications channel, for example, an Enterprise System Connection (ESCON) channel used in IBM mainframe computers.

The tape library 102 may include a library manager 110, one or more data drive devices which may be tape cartridges 112 (secondary cache shown as 112a-e), an accessor 114, and a plurality of mountable media 116. In one embodiment, the mountable media 116 includes tape cartridges, magnetic disks, optical disks, CDs, DVDs, other devices that can store data and be mounted to a drive unit, and the like. The library manager 110, which includes at least one computing processor, may be interconnected with and may control the actions of the tape cartridges 112 and the accessor 114. The configuration of the library manager 110 will be shown and described in greater detail below. The mechanisms of the illustrated embodiments use two types of cache, a primary cache (VTS 104) and a secondary cache in the hierarchical storage management (HSM) system. Such configuration allows the VTS 104 to present to the user or host 106 a file on the disk cache as if it were a virtual tape and the user writes or reads data to or from the file. The file, as the virtual tape generated by the host, is later migrated to a real tape at an appropriate time. However, the mechanisms of the illustrated embodiments may provide for the real tape or tape cartridges to be real or virtual.

In FIG. 5, five tape cartridges 112a, 112b, 112c, 112d, and 112e are shown. The present invention is operable with one or more tape drives 113. The tape drives 113 are configured for assisting with mounting and demounting user data and log data. The tape cartridges 112 may share one single repository of mountable media 116. Alternatively, the tape cartridges 112 may utilize multiple repositories of mountable media 116. The tape cartridges 112 may advantageously be distributed over multiple locations to decrease the probability that multiple tape cartridges 112 will be incapacitated by a disaster in one location.

The interconnections between the library manager 110, the tape cartridges 112, and the accessor 114 are shown as dashed lines to indicate that the library manager 110 transmits and receives control signals, rather than data to be stored or retrieved, to the tape cartridges 112 and/or the accessor 114. Data for storage or retrieval may instead be transmitted directly between the VTS 104 and the tape cartridges 112 via a network 118, which may be a storage area network, (SAN), local area network (LAN), wide area network (WAN), or another suitable type of network, including the Internet or a direct connection between the VTS 104 and the tape cartridges 112 via a point to point or multi-drop buss connection, for example, a Small Computer Storage Interface (SCSI) interface. Alternatively, control signals for tape drives 112 can be transmitted and received through connections between the VTS 104 and the library manager 110 and the VTS 104 and the tape drives 112 via network 118.

The accessor 114 may be a robotic arm or another mechanical device configured to transport a selected mountable media 116 between a storage bin and tape cartridges 112. The accessor 114 typically includes a gripper and a bar code scanner, or a similar read system mounted on the gripper. The bar code scanner is used to read a volume serial number (VOLSER) printed on a cartridge label affixed to the tape cartridge 112. In alternative embodiments, the tape cartridges 112 may be replaced by optical disk drives or other magnetic drives. Similarly, the mountable media 116 and the tape drive 113 may include magnetic media, optical media, or any other removable media corresponding to the type of drive employed. A control console 120 may be connected to the library manager 110. The control console 120 may be a computer in communication with the library manager 110 so that a user can control the operating parameters of the tape library 102 independently of the host 106.

In addition, the described exemplary embodiment may be implemented by various means, such as hardware, software, firmware, or a combination thereof, operational on or otherwise associated with the computing environment. For example, the method 100, as well as the following illustrated exemplary methods may be implemented partially or wholly, as a computer program product including a computer-readable storage medium having computer-readable program code portions stored therein. The computer-readable storage medium may include disk drives, flash memory, digital versatile disks (DVDs), compact disks (CDs), and other types of storage mediums as has been previously described.

Figure 6:
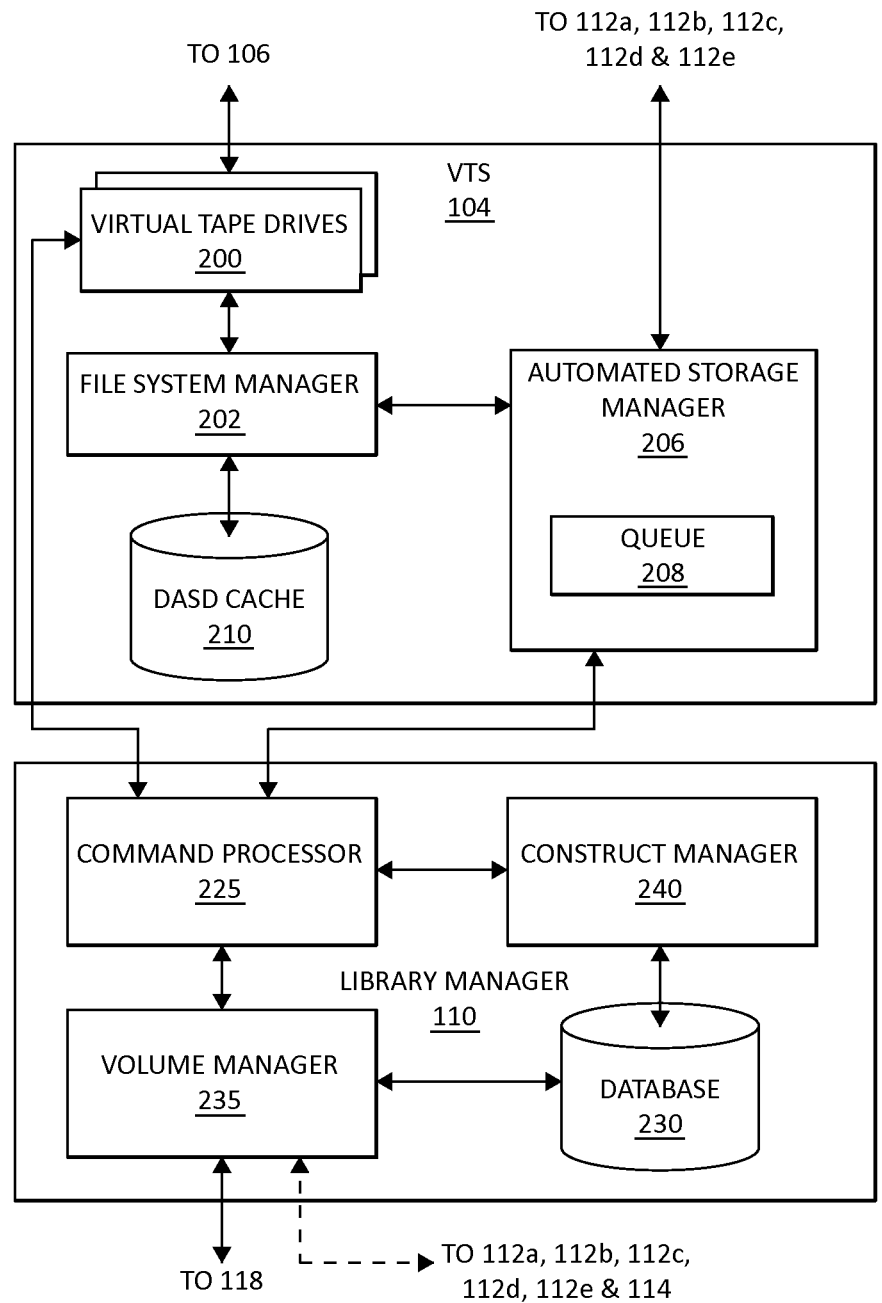
FIG. 6 is a block diagram of an exemplary embodiment of a virtual tape server (VTS) and library manager.

FIG. 6 illustrates a schematic block diagram depicting one embodiment of the VTS 104 and one embodiment of the library manager 110 of FIG. 1. The VTS 104 and the library manager 110 may each take the form of a computer with a bus, processor, memory, and the like. These elements have been omitted from FIG. 6 to more clearly depict the various executable modules and data blocks of the VTS 104 and the library manager 110 pertinent to the invention. There could also be other executable modules and data blocks known in the art in implementing a VTS 104 or library manager 110, but they are omitted in order to focus on the elements essential to the invention.

As shown, the VTS 104 includes a plurality of virtual tape drives 200, a file system manager 202, an automated storage manager 206, a queue 208, and at least one direct access storage device (DASD) cache 210. The DASD cache 210 temporarily stores data from the host 106 on virtual or logical volumes in the form of files, and may thus be referred to as a primary cache. A write command from the host 106 is processed by the VTS 104, through a virtual tape drive 200 into the DASD cache 210, prior to transferring the updated logical volume from the DASD cache 210 to the mountable media or physical volume 116 (FIG. 5). According to one example, the DASD cache 210 takes the form of one or more hard disk drives, which may be arranged in a redundant array of independent drives (RAID configuration), such as RAID 5. The virtual tape drives 200 also process control commands from host 106.

The file system manager 202 manages and coordinates data storage in the DASD cache 210. The automated storage manager 206 controls the interface communications between the file system manager 202 and the tape cartridges 112. The automated storage manager 206 also controls communications between the VTS 104 and the library manager 110. In one embodiment, the host 106 may request a particular logical volume. The automated storage manager 206 determines whether the logical volume is in the DASD cache 210. If it is not, the automated storage manager 206 requests a recall for it from the physical volume or mountable media 116. The automated storage manage 206 may also contain a queue 208 for temporarily placing additional recall requests to be processed. Thus, the automated storage manager 206 is an apparatus for recalling logical volumes from mountable media 116 by means of the tape drives 112 a, b, c, d, and e (FIG. 5).

The library manager 110 manages the virtual and physical volumes as well as the constructs. More specifically, the library manager 110 includes the command processor 225 that receives control commands from the virtual tape drives 200 and the automated storage manager 206. The command processor 225 passes instructions about the management of the virtual and physical volumes to the volume manager 235. The volume manager 235 stores information about the virtual and physical volumes on a database 230 of the library manager 110. In addition, depending on the instructions received, the volume manager sends instructions to the tape cartridges 112 and/or the accessor 114 to load or "mount" the cartridges or other mountable media 116 on which copies of the virtual volume are to be made or retrieved. Mounting of multiple cartridges 116 may be generally simultaneous or in a certain order, depending on the configuration of the accessor 114 and the tape cartridges 112.

The library manager 110 also has a construct manager 240 that receives user instructions from the control console 120 regarding the volume management actions to be followed for a given construct name. The volume management actions are stored and retrieved by the construct manager 240 on a database 230 of the library manager 110. For certain control commands received by the command processor 225, the command processor 225 instructs the construct manager 240 to provide the volume management actions for a specific virtual volume. The command processor 225 then passes the returned volume management actions for a specific virtual volume to the automated storage manager 206.

Figure 7:
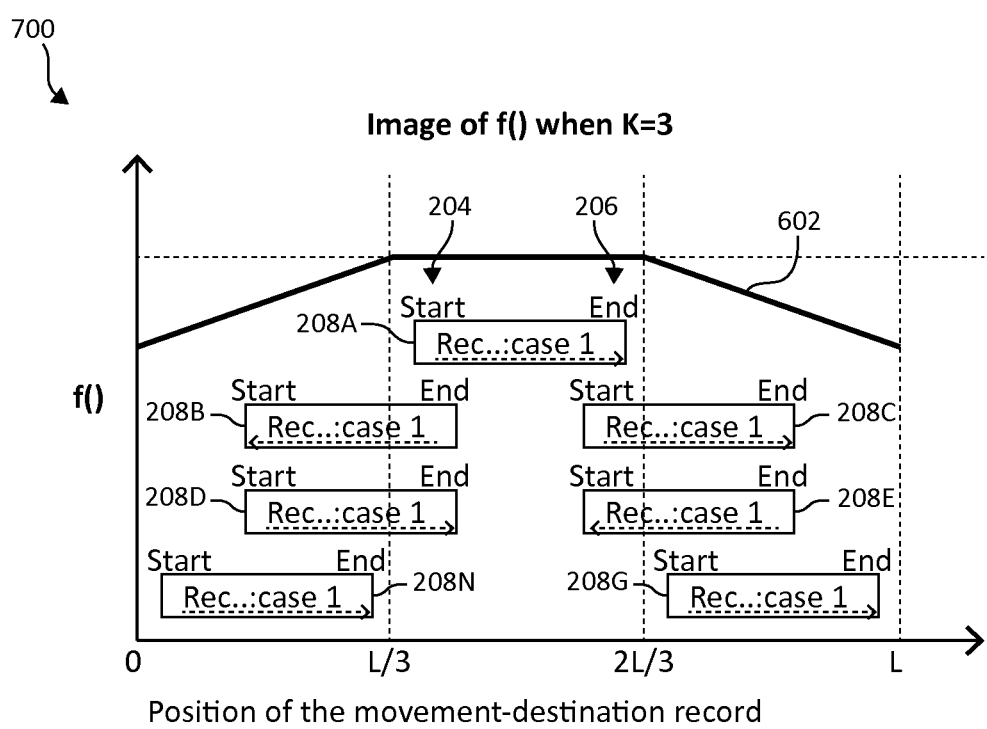
FIG. 7 is a block diagram of an exemplary embodiment showing the length direction position of the movement-destination record showing linear changes.

FIG. 7 is a block diagram of an exemplary embodiment illustrating the length direction position of the movement-destination record illustrating linear changes. The rough image of f( ) is illustrated when K=3. As illustrated, the record 208 (illustrated in the diagram as 208a-n) has a beginning (e.g., start) 204 and an end 206. Applying the logical record-group-to-record-group distance I(A, B) from a group of records (e.g., 208A), which is the source (departure) of movement, to another group of records (e.g., 208B), the values returned by the calculation function "f( )" changes linearly depending on the position in the length direction "L" of the tape medium. The rough image of f( ) is illustrated when K=3. Here the records 208 are viewed from the length direction in the various regions of the tape divided up in three regions; L/3, 2 L/3, and L. In FIG. 7, the solid, linear line is the value of the calculation function "f( )" (e.g., the coefficient). In the end region (it means around 0 or around L on horizontal axis), the value of the coefficient is smaller than the value in the middle region (conversion with relative smallness means between L/3 and 2 L/3).

Figure 8:
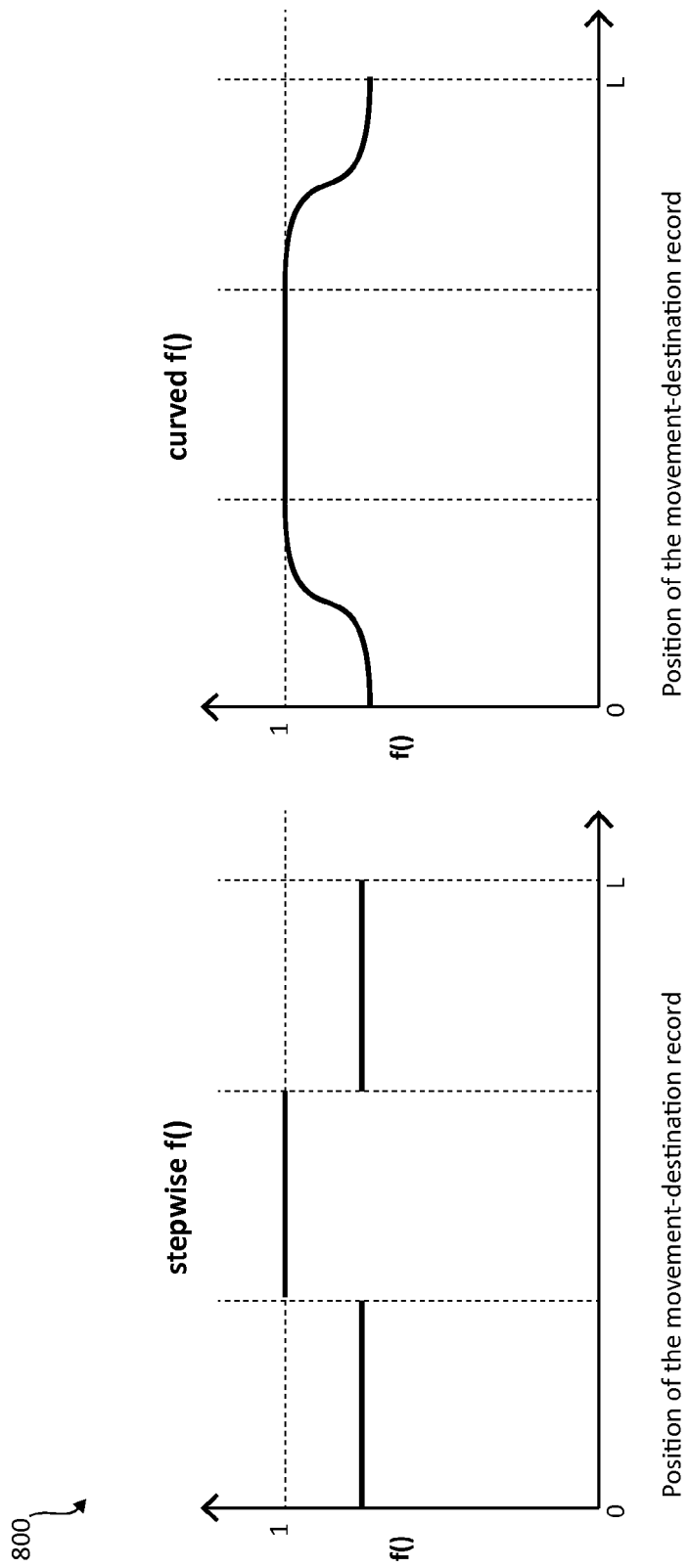
FIG. 8 is a block diagram of an exemplary embodiment showing the length direction position of the movement-destination record showing stepwise and curved changes.

FIG. 8 is a block diagram of an exemplary embodiment showing the length direction position of the movement-destination record showing stepwise and curved changes. In the embodiment as described above, the value returned by the calculation function "f( )" changes either in a stepwise or in a curved pattern over the tape media divided into regions of length "L". The rough image of f( ) is illustrated when K=n. As illustrated, applying the logical record-group-to-record-group distance I(A, B) from a group of records (e.g., 208A as seen in FIG. 7), which is the source (departure) of movement, to another group of records (e.g., 208B as seen in FIG. 7), the values returned by f( ) changes either in a stepwise or a curve depending on the position in the length direction of the tape medium.

Hence, the illustrated embodiments described herein reduce the total time taken for positioning (e.g., a reduction in total seek time). In one embodiment, the present invention provides a solution for reducing the total seek time for determining a sequence of accesses to a plurality of data groups that are stored in a tape medium. In one embodiment, by way of example only, a first data group in the access sequence based on which data group in the plurality of data groups has a beginning closest in distance to a current position of the tape medium is selected. For the selection of the data group that has the start part that is the closest to the current position, data groups that are located in a specified region (e.g., each end region) as viewed in a length direction of the tape medium are separated from a plurality of data groups that are located in an alternative specified region (e.g., the middle region) viewed in the length direction of the tape medium. A distance from the current position is set to be a value that is smaller than an actual value by conversion with relative smallness for the data groups that are located in the end region as compared with the data groups that are located in the middle region.

Although the present invention has been described above on the basis of the embodiment, the technical scope of the present invention is not limited to the above embodiment. It is apparent to those skilled in the art that various modifications or improvements can be added to the above embodiment.

It should be noted that execution orders of processes, such as operations, procedures, steps and stages in the devices, systems, programs and methods shown in the scope of claims, the description and the drawings, are not clearly specified particularly by use of expressions such as "before" and "prior to." Therefore, those processes are executable in any orders unless an output from a preceding process is used in a process subsequent thereto. Even if any operational flow in the scope of claims, in the description or in the drawings has been described by use of expressions such as "firstly," and "subsequently," for the sake of convenience, this does not necessarily mean that the operational flow has to be executed by an order indicated by these expressions.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Program code embodied on a computer readable medium may be transmitted using any appropriate medium, including but not limited to wireless, wired, optical fiber cable, RF, etc., or any suitable combination of the foregoing. Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks. The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagram in the above figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions (i.e., executable portions) for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While one or more embodiments of the present invention have been illustrated in detail, one of ordinary skill in the art will appreciate that modifications and adaptations to those embodiments may be made without departing from the scope of the present invention as set forth in the following claims.

What is claimed is:

1. A method using a processor device for reducing total seek time for determining an access sequence of a plurality of data groups stored on a tape medium, the method, using the processor device, comprising:
    selecting, using the processor device, a first data group in the access sequence wherein:
        those of the plurality of data groups that are located in specified regions of the tape medium are separated from those of the plurality of data groups that are located in alternative specified regions of the tape medium, and
        the distance from the current position of the tape medium is set to be a logical distance value, determined by a calculation function, that is substituted for an actual physical distance value for the specified regions different from the alternative specified regions;
    selecting, using the processor device, a second data group in the access sequence; and
    multiplying, for determining the logical distance value, a coefficient based on a physical positioning of each of the plurality of data groups in the tape medium and a percentage of those of the plurality of data groups that have already been selected as the first data group and the second data group.

2. The method of claim 1, further performing one of:
    selecting the first data group based on the data group in the plurality of data groups having a beginning closest in distance, according to the logical distance value, to a current position; and
    selecting a second data group in the access sequence based on which remaining data group in the plurality of data groups has a beginning closest to an end of the first data group in the access sequence.

3. The method of claim 1, further including performing one of:
    determining the logical distance value to be 1 if both the beginning and an end of a movement-destination one of the plurality of data groups are not less than (L/K) and not greater than (L*(K−1)/K),
    determining the logical distance value to be [1−(L/K−E)/(L/K)*a( )] if the beginning of the movement-destination one of the plurality of data groups is not less than (L/K) and not greater than (L*(K−1)/K) and the end of the movement-destination one of the plurality of data groups is less than (L/K),
    determining the logical distance value to be [1−(L/K−E)/(L/K)*a( )] where a value of E is assumed to be a value of (L−E) if the end of the movement-destination one of the plurality of data groups is greater than [L*(K−1)/K],
    determining the logical distance value to be [1−(L/K−S)/(L/K)*a( )] if the end of the movement-destination one of the plurality of data groups is not less than (L/K) and not greater than (L*(K−1)/K) and the beginning of the movement-destination one of the plurality of data groups is less than (L/K),
    determining the logical distance value to be [1−(L/K−S)/(L/K)*a( )] where a value of S is assumed to be the value of (L−S) if the beginning of the movement-destination one of the plurality of data groups is greater than [L*(K−1)/K],
    determining the logical distance value to be 1−(L/K−S)/(L/K)*a( )−(L/K−E)/(L/K)*a( )] if both the beginning and the end of the movement-destination one of the plurality of data groups are less than (L/K), and
    determining the logical distance value to be 1−(L/K−S)/(L/K)*a( )−(L/K−E)/(L/K)*a( )] if either one of or both the beginning and the tail of the movement-destination one of the plurality of data groups is greater than [L*(K−1)/K], where a value of S is assumed to be the value of (L−S),
    where L is an entire length of the tape media, S is a position of the beginning of the movement-destination one of the plurality of data groups in the length direction of the tape medium, E is a position of the end of the movement-destination one of the plurality of data groups in the length direction of the tape medium, K is a constant that is used for determining a resolution in the length direction of the tape medium when finding the coefficient, and a( ) is a function for determining an auxiliary coefficient for determining the logical distance value that is to be determined.

4. The method of claim 1, wherein the logical distance value changes by one of a linear, stepwise, and curved pattern according to the calculation function.

5. The method of claim 1, further including separating the specified regions that are viewed from a length direction, at two respective ends, and the alternative specified regions of the tape medium by dividing an entire region, which includes the specified regions and the alternative specified regions, into three regions in the length direction of the tape medium.

6. The method of claim 1, further including selecting an nth data group in the access sequence based on which remaining data group in the plurality of data groups has a beginning closest to an end of an (n−1)th data group in the access sequence.

7. The method of claim 6, wherein the nth data group is a last data group in the access sequence if there are no remaining data groups in the plurality of data groups.

8. A system for reducing total seek time for determining an access sequence of a plurality of data groups stored on a tape medium, the system comprising:
    a processor device, controlling the tape medium and the plurality of data groups, wherein the processor device:
        selects a first data group in the access sequence wherein:
            those of the plurality of data groups that are located in specified regions of the tape medium are separated from those of the plurality of data groups that are located in alternative specified regions of the tape medium, and the distance from the current position of the tape medium is set to be a logical distance value, determined by a calculation function, that is substituted for an actual physical distance value for the alternative specified regions;

selects a second data group in the access sequence; and multiplies, for determining the logical distance value, a coefficient based on a physical positioning of each of the plurality of data groups in the tape medium and a percentage of those of the plurality of data groups that have already been selected as the first data group and the second data group.

9. The system of claim 8, wherein the processor device performs one of:

selecting the first data group based on the data group in the plurality of data groups having a beginning closest in distance, according to the logical distance value, to a current position and;

selecting a second data group in the access sequence based on which remaining data group in the plurality of data groups has a beginning closest to an end of the first data group in the access sequence.

10. The system of claim 8, wherein the processor device performs one of:

determining the logical distance value to be 1 if both the beginning and the end of the movement-destination one of the plurality of data groups are not less than (L/K) and not greater than (L*(K−1)/K), determining the logical distance value to be [1−(L/K−E)/(L/K)*a( )] if the beginning of the movement-destination one of the plurality of data groups is not less than (L/K) and not greater than (L*(K−1)/K) and the end of the movement-destination one of the plurality of data groups is less than (L/K), determining the logical distance value to be [1−(L/K−E)/(L/K)*a( )] where a value of E is assumed to be a value of (L−E) if the end of the movement-destination one of the plurality of data groups is greater than [L*(K−1)/K], determining the logical distance value to be [1−(L/K−S)/(L/K)*a( )] if the end of the movement-destination one of the plurality of data groups is not less than (L/K) and not greater than (L*(K−1)/K) and the beginning of the movement-destination one of the plurality of data groups is less than (L/K), determining the logical distance value to be [1−(L/K−S)/(L/K)*a( )] where a value of S is assumed to be the value of (L−S) if the beginning of the movement-destination one of the plurality of data groups is greater than [L*(K−1)/K], determining the logical distance value to be 1−(L/K−S)/(L/K)*a( )−(L/K−E)/(L/K)*a( )] if both the beginning and the end of the movement-destination one of the plurality of data groups are less than (L/K), and determining the logical distance value to be 1−(L/K−S)/(L/K)*a( )−(L/K−E)/(L/K)*a( )] if either one of or both the beginning and the end of the movement-destination one of the plurality of data groups is greater than [L*(K−1)/K], where a value of S is assumed to be the value of (L−S), where L is an entire length of the tape media, S is a position of the beginning of the movement-destination one of the plurality of data groups in the length direction of the tape medium, E is a position of the end of the movement-destination one of the plurality of data groups in the length direction of the tape medium, K is a constant that is used for determining a resolution in the length direction of the tape medium when finding the coefficient, and a( ) is a function for determining an auxiliary coefficient for determining the logical distance value that is to be determined.

11. The system of claim 8, wherein the processor device changes the logical distance value by one of a linear, stepwise, and curved pattern according to the calculation function.

12. The system of claim 8, wherein the processor device separates the specified regions that are viewed from a length direction, at two respective ends, and the alternative specified regions of the tape medium by dividing an entire region, which includes the specified regions and the alternative specified regions, into three regions in the length direction of the tape medium.

13. The system of claim 8, wherein the processor device selects an nth data group in the access sequence based on which remaining data group in the plurality of data groups has a beginning closest to an end of an (n−1)th data group in the access sequence.

14. The system of claim 13, wherein the nth data group is a last data group in the access sequence if there are no remaining data groups in the plurality of data groups.

15. A computer program product for reducing total seek time for determining an access sequence of a plurality of data groups stored on a tape medium in a computing environment by a processor device, the computer program product comprising a non-transitory computer-readable storage medium having computer-readable program code portions stored therein, the computer-readable program code portions comprising:

a first executable portion that selects a first data group in the access sequence wherein:

those of the plurality of data groups that are located in specified regions of the tape medium are separated from those of the plurality of data groups that are located in alternative specified regions of the tape medium, and the distance from the current position of the tape medium is set to be a logical distance value, determined by a calculation function, that is substituted for an actual physical distance value for the alternative specified regions;

a second executable portion that selects a second data group in the access; and a third executable portion that multiplies, for determining the logical distance value, a coefficient based on a physical positioning of each of the plurality of data groups in the tape medium and a percentage of those of the plurality of data groups that have already been selected as the first data group and the second data group.

16. The computer program product of claim 15, further including a fourth executable portion that performs one of:

selecting the first data group based on the data group in the plurality of data groups having a beginning closest in distance, according to the logical distance value, to a current position and;

selecting a second data group in the access sequence based on which remaining data group in the plurality of data groups has a beginning closest to an end of the first data group in the access sequence.

17. The computer program product of claim 15, further including a fourth executable portion that performs one of:

determining the logical distance value to be 1 if both the beginning and the end of the movement-destination one of the plurality of data groups are not less than (L/K) and not greater than (L*(K−1)/K), determining the logical distance value to be [1−(L/K−E)/(L/K)*a( )] if the beginning of the movement-destination one of the plurality of data groups is not less than (L/K) and not greater than (L*(K−1)/K) and the end of the movement-destination one of the plurality of data groups is less than (L/K), determining the logical distance value to be [1−(L/K−E)/(L/K)*a( )] where a value of E is assumed to be a value of (L−E) if the end of the movement-destination one of the plurality of data groups is greater than [L*(K−1)/K], determining the logical distance value to be [1−(L/K−S)/(L/K)*a( )] if the end of the movement-destination one of the plurality of data groups is not less than (L/K) and not greater than (L*(K−1)/K) and the beginning of the movement-destination one of the plurality of data groups is less than (L/K), determining the logical distance value to be [1−(L/K−S)/(L/K)*a( )] where a value of S is assumed to be the value of (L−S) if the beginning of the movement-destination one of the plurality of data groups is greater than [L*(K−1)/K], determining the logical distance value to be 1−(L/K−S)/(L/K)*a( )−(L/K−E)/(L/K)*a( )] if both the beginning and the end of the movement-destination one of the plurality of data groups are less than (L/K), and determining the logical distance value to be 1−(L/K−S)/(L/K)*a( )−(L/K−E)/(L/K)*a( )] if either one of or both the beginning and the end of the movement-destination one of the plurality of data groups is greater than [L*(K−1)/K], where a value of S is assumed to be the value of (L−S), where L is an entire length of the tape media, S is a position of the beginning of the movement-destination one of the plurality of data groups in the length direction of the tape medium, E is a position of the end of the movement-destination one of the plurality of data groups in the length direction of the tape medium, K is a constant that is used for determining a resolution in the length direction of the tape medium when finding the coefficient, and a( ) is a function for determining an auxiliary coefficient for determining the logical distance value that is to be determined.

18. The computer program product of claim 15, wherein the logical distance value changes by one of a linear, stepwise, and curved pattern according to the calculation function.

19. The computer program product of claim 15, further including a fourth executable portion that separates the specified regions that are viewed from a length direction, at two respective ends, and the alternative specified regions of the tape medium by dividing an entire region, which includes the specified regions and the alternative specified regions, into three regions in the length direction of the tape medium.

20. The computer program product of claim 15, further including a fourth executable portion that selects an nth data group in the access sequence based on which remaining data group in the plurality of data groups has a beginning closest to an end of an (n−1)th data group in the access sequence.

21. The computer program product of claim 20, wherein the nth data group is a last data group in the access sequence if there are no remaining data groups in the plurality of data groups.

* * * * *